(12) United States Patent
Wolfrath et al.

(10) Patent No.: US 8,352,294 B2
(45) Date of Patent: Jan. 8, 2013

(54) AUTOMATIC INCOME ADJUSTMENT

(75) Inventors: Stephen R. Wolfrath, Eagan, MN (US);
Tamara L. Pollock, Coon Rapids, MN (US); Gumer Cruz Alvero, Edina, MN (US); Douglas Dunning, Apple Valley, MN (US); Sara Janz, Minneapolis, MN (US); Lynn Murphy Abbott, Minneapolis, MN (US); Joseph P. Heckel, Shoreview, MN (US); Debra Miller Ekberg, Champlin, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 221 days.

(21) Appl. No.: 12/853,159

(22) Filed: Aug. 9, 2010

(65) Prior Publication Data
US 2012/0036087 A1    Feb. 9, 2012

(51) Int. Cl.
*G06Q 40/00* (2012.01)
(52) U.S. Cl. ............................................. 705/4; 705/35
(58) Field of Classification Search .................... 705/35, 705/4
See application file for complete search history.

(56) References Cited

U.S. PATENT DOCUMENTS

| 6,611,815 | B1 | 8/2003 | Lewis et al. | |
| 7,877,307 | B2* | 1/2011 | Tatro et al. | 705/35 |
| 2001/0014873 | A1 | 8/2001 | Henderson et al. | |
| 2003/0088430 | A1* | 5/2003 | Ruark | 705/1 |
| 2006/0111997 | A1 | 5/2006 | Abbott et al. | |
| 2007/0198377 | A1 | 8/2007 | Livingston et al. | |
| 2009/0089218 | A1 | 4/2009 | McCullough | |
| 2009/0276369 | A1 | 11/2009 | Mabry et al. | |

OTHER PUBLICATIONS

Registration Statement Under The Securities Act of 1933 Post-Effective Amendment No. 39, Lincoln Growth4IncomeSM Guarantee, The Lincoln National Life Insurance Company, Dec. 22, 2009 (26 pgs).

* cited by examiner

*Primary Examiner* — Jagdish Patel
(74) *Attorney, Agent, or Firm* — Toler Law Group, PC

(57) ABSTRACT

A method includes receiving market data associated with an investment product that specifies a first guaranteed annual withdrawal amount and a second guaranteed annual withdrawal amount, where the first guaranteed annual withdrawal amount is greater than the second guaranteed annual withdrawal amount. The method includes automatically selecting a guaranteed annual withdrawal amount from the first guaranteed annual withdrawal amount and the second guaranteed annual withdrawal amount based on at least an evaluation of the market data.

14 Claims, 8 Drawing Sheets

| Contract Year | Attained Age | Net Return | EOY Gross W/D | EOY WAB | EOY BDP | WD % | EOY CV | GBA | GBP | ALP | EOY RBA |
|---|---|---|---|---|---|---|---|---|---|---|---|
| 1 | 62 | -8% | 0 | 100,000 | 8.0% | 6% | 92,000 | 100,000 | 6,000 | 0 | 100,000 |
| 2 | 63 | -8% | 0 | 100,000 | 15.4% | 6% | 84,640 | 100,000 | 6,000 | 0 | 100,000 |
| 3 | 64 | -8% | 0 | 100,000 | 22.1% | 5% | 77,869 | 100,000 | 5,000 | 0 | 100,000 |
| 4 | 65 | 0% | 5,000 | 93,579 | 22.1% | 5% | 72,869 | 100,000 | 5,000 | 5,000 | 95,000 |
| 5 | 66 | 8% | 6,000 | 86,444 | 15.9% | 6% | 72,698 | 100,000 | 6,000 | 6,000 | 89,000 |
| 6 | 67 | 8% | 6,000 | 79,838 | 9.2% | 6% | 72,514 | 100,000 | 6,000 | 6,000 | 83,000 |
| 7 | 68 | -10% | 6,000 | 72,498 | 18.3% | 6% | 59,263 | 100,000 | 6,000 | 6,000 | 77,000 |
| 8 | 69 | -10% | 5,000 | 65,702 | 26.4% | 5% | 48,336 | 100,000 | 6,000 | 5,000 | 72,000 |
| 9 | 70 | -15% | 5,000 | 57,706 | 37.5% | 5% | 36,086 | 100,000 | 5,000 | 5,000 | 67,000 |
| 10 | 71 | -10% | 5,000 | 48,822 | 43.7% | 5% | 27,477 | 100,000 | 5,000 | 5,000 | 62,000 |

FIG. 2

| Contract Year | Attained Age | Net Return | EOY Gross WD | EOY WAB | EOY BDP | WD % | EOY CV | ALP | EOY BB |
|---|---|---|---|---|---|---|---|---|---|
| 1 | 65 | -10% | 0 | 108,000 | 16.7% | 6% | 90,000 | 0 | 108,000 |
| 2 | 66 | -10% | 0 | 114,000 | 25.0% | 5% | 81,000 | 0 | 114,000 |
| 3 | 67 | 10% | 0 | 120,000 | 21.8% | 5% | 89,100 | 0 | 120,000 |
| 4 | 68 | 10% | 7,200 | 111,185 | 18.3% | 6% | 90,810 | 7,200 | 120,000 |
| 5 | 69 | 10% | 7,200 | 103,171 | 10.2% | 6% | 92,691 | 7,200 | 120,000 |
| 6 | 70 | -10% | 7,200 | 94,266 | 19.1% | 6% | 76,222 | 7,200 | 120,000 |
| 7 | 71 | -12% | 6,000 | 85,834 | 28.8% | 5% | 61,075 | 6,000 | 120,000 |
| 8 | 72 | 10% | 6,000 | 78,168 | 21.7% | 5% | 61,183 | 6,000 | 120,000 |
| 9 | 73 | 10% | 7,200 | 69,806 | 13.9% | 6% | 60,101 | 7,200 | 120,000 |
| 10 | 74 | 10% | 7,200 | 62,203 | 5.3% | 6% | 58,911 | 7,200 | 120,000 |

*FIG. 3*

AUTOMATIC INCOME ADJUSTMENT

FIELD

The present disclosure generally relates to investment products that guarantee an annual withdrawal amount, and more particularly to automatic adjustment of the guaranteed annual withdrawal amount under certain conditions.

BACKGROUND

Investment products are often tailored to address the investment goals of investors. Investors may have concerns related to a loss of principal investment due to market returns and volatility, having the ability to increase income, and ensuring an adequate amount of retirement savings and not outliving their income. In the past, a retiree typically relied on employer pension plans and Social Security to meet these concerns. However, these traditional sources of retirement income may no longer be sufficient to satisfy these concerns.

Investment product issuers derive revenue by selling the products to investors and charging fees associated with the products. However, investment products that provide guarantees to an investor regarding the value, benefits or payments of the investment product are also a source of financial risk to the investment product issuers. To manage and mitigate this financial risk, an issuer typically offers the financial product subject to special rules and fees that are incorporated into the financial product through an agreement with the investor. Such agreements can be a legal contract, product terms and conditions, a rider to a contract, a certificate, etc.

For example, an annuity is a contract in which an investor makes a lump-sum payment or series of payments in exchange for periodic payments that begin either immediately or at some future date. In general, two types of annuities exist, a fixed annuity and a variable annuity. A fixed annuity is designed such that the investor earns on a tax deferred basis a minimum guaranteed rate of interest, plus any discretionary higher rate, during the time that the investor's account is growing. Periodic payments may last for a definite period, such as 20 years, or an indefinite period, such as the lifetime of the investor, or the lifetimes of the investor and the spouse of the investor. In contrast, in a variable annuity, an investor may elect to invest in a range of different investment options, typically either in a fixed option (similar to a fixed annuity), or in underlying funds (similar to mutual funds). The rate of return on the variable annuity and the amount of the periodic payments to be paid often varies depending on the performance of the investment options selected.

SUMMARY

The present disclosure describes an automatic income adjustment system that reduces a guaranteed withdrawal amount when a contract value is below a threshold. For example, a variable annuity contract may include an associated guaranteed withdrawal benefit rider that specifies different guaranteed annual withdrawal amounts. A higher guaranteed annual withdrawal amount may be available under certain conditions, while a reduced guaranteed annual withdrawal amount may be available under other conditions.

A market decline may result in a decline in the contract value that may increase the risks and costs to the provider of the variable annuity contract. Reducing the guaranteed annual withdrawal amount under certain conditions may be advantageous to the provider of the variable annuity contract in order to reduce the risks and costs. Further, reducing the guaranteed annual withdrawal amount may be advantageous to the client by allowing additional time for the contract value to recover. The cost savings to the provider associated with the reduced guaranteed annual withdrawal amount may be passed along to the investor in the form of reduced fees. Increasing the guaranteed annual withdrawal amount under other conditions may provide an "income bonus" to an owner of the investment product.

BRIEF DESCRIPTION OF THE DRAWINGS

FIG. 2 depicts a first chart to illustrate an annual determination of an ALP percentage based on a comparison of a calculated BDP to a threshold BDP;

FIG. 3 depicts a second chart to illustrate an annual determination of an ALP percentage based on a comparison of a calculated BDP to a threshold BDP;

DETAILED DESCRIPTION

Figure 1:
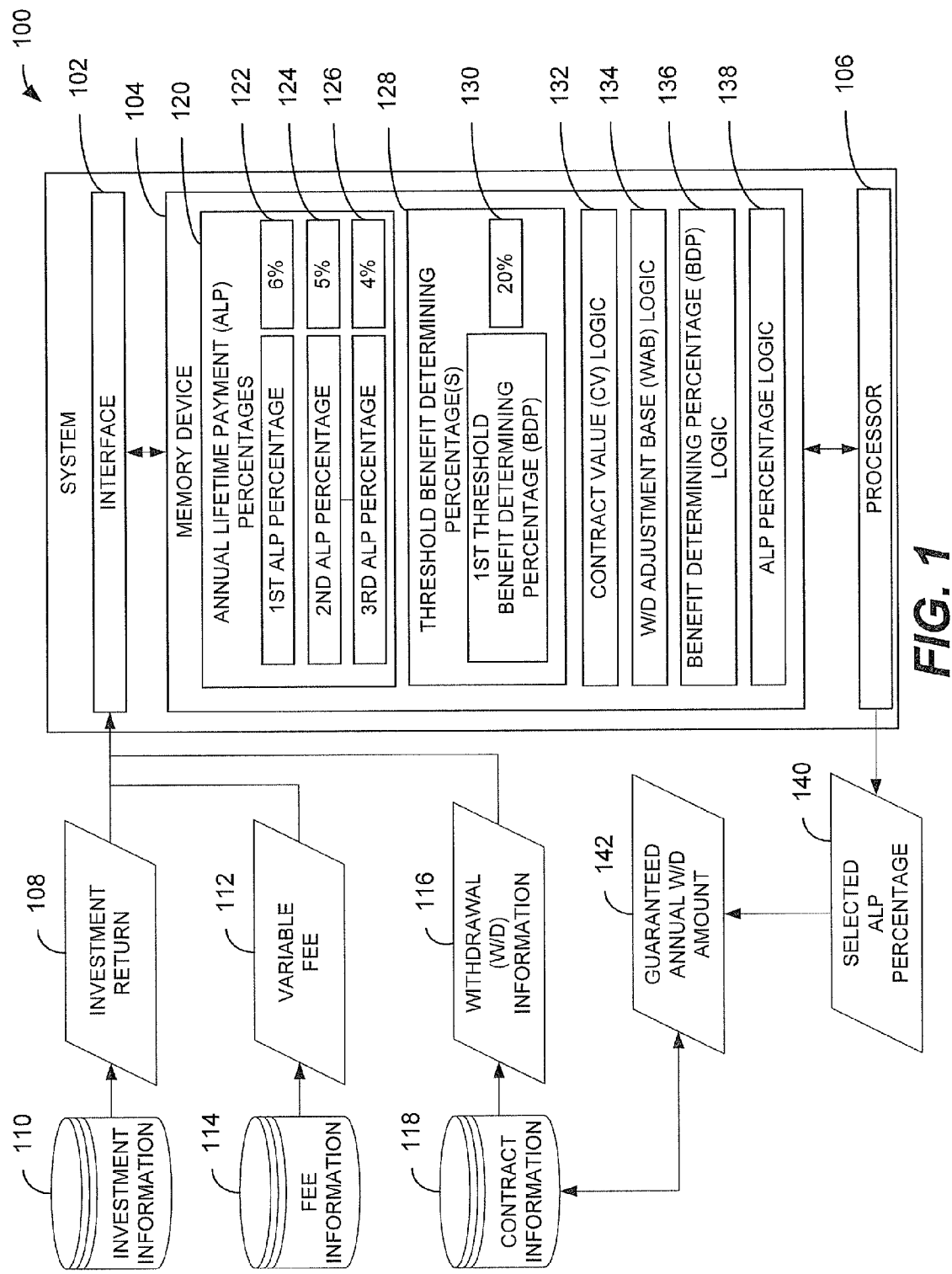
FIG. 1 is a block diagram of a particular illustrative embodiment of a system to automatically select an annual lifetime payment (ALP) percentage based on a comparison of a calculated benefit determining percentage (BDP) to a threshold BDP.

The present disclosure describes automatic adjustment of a guaranteed withdrawal amount based on a relationship between a value of an investment and a value that tracks the guarantee provided. A first guaranteed withdrawal amount is automatically selected when a comparison of these values satisfies a threshold, while a second guaranteed withdrawal amount is automatically selected when the comparison of the values does not satisfy the threshold. Varying the guaranteed withdrawal amount under certain conditions may provide benefits to both the provider and the investor.

As used herein, the term "entity" may include any individual, consumer, customer, financial advisor, group, business, organization, government entity, transaction account issuer or processor, merchant, consortium of merchants, account holder, charitable organization, software, hardware, and/or any other entity or someone acting on behalf of the entity or user.

A "rider" includes additional features, provisions or information of a financial product (e.g., an annuity rider) including a rider to a contract or a certificate associated with a group contract or revision to an investment plan. Riders often enhance the value of a contract or investment plan. For example, an annuity rider may increase the value of the annuity while the client is living, enhances the death benefit, or provides other features like extra money if long-term care is needed.

An investment product "administrator," "issuer," or "provider" includes any entity that issues, manages, maintains, sells services in connection with, is liable for paying benefits for, or is responsible for administering a financial product. An "owner" or "client" includes any entity who controls (i.e., has authority to direct), owns, or is a current or future beneficiary of a financial product such as an annuity contract or rider.

A "contract date" includes the date from which contract anniversaries, contract years, and contract months are determined. A "contract anniversary" includes the same day and month as the contract date each year that the contract remains in force. A "contract year age" includes the age of the contract owner on the contract anniversary.

A "rider effective date" includes the date when the rider becomes effective. In one embodiment, the rider effective date defaults to the contract date unless otherwise provided. A "rider anniversary" includes the same date as the contract anniversary unless the rider is issued after the contract date. For example, the rider anniversary may include the same day and month as the rider effective date each year that the rider remains in force.

A "waiting period" includes the number of years, starting on the rider effective date, that the benefits may be limited. For example, the ability to utilize both step-ups and withdrawals is specially defined, is limited or otherwise altered. A "withdrawal" includes the amount by which the contract value is reduced as a result of a surrender request. In one embodiment, withdrawal is synonymous with the term "surrender" in the contract.

A "benefit base" includes an amount used to calculate contract benefits and may initially be set to the amount of the purchase payment (e.g., premium payment). In one embodiment, the benefit base will be increased by the amount of additional purchase payments. The benefit base can also increase by applying credits, step-ups, spousal continuation step-ups In one embodiment, the benefit can decrease based upon asset allocation changes, excess withdrawals.

A "withdrawal adjustment base" (WAB) is the value used to determine a "benefit determining percentage" (BDP). The BDP is a percentage difference between the WAB and a "contract value" (CV). The BDP may be determined at the beginning of the year, at the time of withdrawal, or on a contract anniversary date, among other alternatives.

A "guaranteed benefit amount" (GBA) includes the amount equal to the total cumulative withdrawals guaranteed by a rider. In one embodiment, the GBA cannot be withdrawn and is not payable as a death benefit. A "remaining benefit payment" (RBP) includes the amount that a rider guarantees will be available for withdrawal during the remainder of the current contract year. In one embodiment, as the owner makes withdrawals during a contract year, the remaining amount that the rider guarantees will be available for withdrawal that year is reduced. A "remaining benefit amount" (RBA) is the total amount of benefit guaranteed for future withdrawals. A "guaranteed benefit payment" (GBP) is a basic benefit amount available each contract year after the waiting period until the RBA is reduced to zero. After the waiting period, the annual withdrawal amount guaranteed by the rider can vary each contract year.

A "covered person" includes the person whose life is used to determine when the annual lifetime payment is established and the duration of the annual lifetime payments. In one embodiment, the covered person may change if there is a spousal continuation or a change of ownership. In one embodiment, if the owner is a non-natural person (i.e., a trust, corporation or other entity), the covered person is the oldest annuitant. "Covered spouses" include the owner and the owner's legally married spouse as defined under federal law, for as long as the marriage is valid and in effect. In one embodiment, covered spouses include those identified on the rider effective date and cannot be changed thereafter. In one embodiment, if the owner is a non-natural person (e.g., a trust), the covered spouses include the annuitant and the legally married spouse of the annuitant.

An "annual lifetime payment attained age" (ALPAA) includes the age at which the lifetime benefit is established. An "annual lifetime payment" (ALP) includes the amount that a rider guarantees will be available for withdrawal each contract year, until death or termination of the rider. In one embodiment, the ALP is calculated at any time after the rider effective date, or the rider anniversary following the date the covered person reaches the ALPAA if later. The BDP determines the withdrawal amount available each year. As withdrawals are made during a contract year, the remaining amount that the rider guarantees that is available for withdrawal that year is reduced. A "remaining annual lifetime payment" (RALP) is the lifetime benefit amount that can be withdrawn during the remainder of the current contract year.

A "step-up" includes an adjustment to a basic benefit value or to a lifetime benefit value. A "step-up date" includes the date that a step-up is processed for an investment product. Step-ups can be processed in any frequency, e.g., annually, monthly, semi-annually, every "x" years (where x is a numeric integer value). In one embodiment, the step-up date is the rider anniversary date if the annual step-up is processed automatically or, if processed manually, the valuation date received with the owner's written request to step-up. In other embodiments, the step-up date is defined in an alternate form. In a particular embodiment, an annual step-up may be available beginning with the first rider anniversary. In this case, if any withdrawals are taken during the waiting period, the annual step-up will not be available until the rider anniversary following the waiting period. Further, if a rider fee increase is declined, future annual step-ups may no longer be available.

Annual step-ups may increase values to the contract value on certain dates, subject to the maximum amount for each value. For example, annual step ups may increase the RBA, GBA, GBP, RBP, ALP, RALP, Benefit Base, PBG, or any combination thereof. Certain values may step up in the waiting period only if certain conditions are met.

In a particular embodiment, a computer-implemented method is disclosed that includes receiving market data associated with an investment product that specifies a first guaranteed annual withdrawal amount and a second guaranteed annual withdrawal amount, where the first guaranteed annual withdrawal amount is greater than the second guaranteed annual withdrawal amount. For example, the investment product may be a variable annuity contract that includes a guaranteed withdrawal benefit rider that specifies the first and second guaranteed annual withdrawal amounts. The method includes automatically selecting a guaranteed annual withdrawal amount from the first guaranteed annual withdrawal amount and the second guaranteed annual withdrawal amount based on at least an evaluation of the market data.

In another particular embodiment, a computer-readable storage medium includes instructions that are executable by a processor. The instructions, when executed by the processor, cause the processor to determine a contract value (CV) associated with a variable annuity contract that includes a guaranteed withdrawal benefit rider (e.g., a guaranteed lifetime withdrawal benefit rider). The instructions, when executed by the processor, further cause the processor to determine a withdrawal adjustment base (WAB) associated with the variable annuity contract and to calculate a benefit determining percentage (BDP) based on the CV and the WAB. When the calculated BDP satisfies a threshold BDP (e.g., when the calculated BDP is less than or equal to the threshold BDP), a first annual lifetime payment (ALP) percentage is automatically selected by a computer without human intervention. When the calculated BDP does not satisfy the threshold BDP (e.g., when the calculated BDP is greater than the threshold BDP), a second ALP percentage is automatically selected. For example, an ALP percentage of six percent (i.e., the first ALP percentage) may be automatically selected by a computer without human intervention when the calculated BDP satisfies the threshold BDP, and an ALP percentage of five percent (i.e., the second ALP percentage) may be automatically selected by a computer without human intervention when the calculated BDP does not satisfy the threshold BDP. In alternative embodiments, the calculated BDP may satisfy the threshold BDP based on other criteria. As an illustrative example, the calculated BDP may satisfy the threshold BDP when the calculated BDP is less than the threshold BDP and may not satisfy the threshold BDP when the calculated BDP is equal to the threshold BDP. A reduced ALP percentage (e.g., five percent) may reduce risk and hedge costs to a provider of the investment product. Further, the reduced ALP percentage may be advantageous to the client by allowing additional time for the contract value to recover. The cost savings to the provider associated with the reduced guaranteed annual withdrawal amount may be passed along to the investor in the form of reduced fees. Increasing the guaranteed annual withdrawal amount under other conditions may provide an "income bonus" to an owner of the investment product.

In another particular embodiment, a system is disclosed that includes an interface, a memory device, and a processor coupled to the memory device. The interface is configured to receive investment return information, variable fee information, and withdrawal information associated with a variable annuity contract that includes a guaranteed lifetime withdrawal benefit rider. In a particular embodiment, the withdrawal information includes end of year (EOY) withdrawal information. The memory device is configured to store a plurality of annual lifetime payment (ALP) percentages, at least one threshold benefit determining percentage (BDP), contract value (CV) logic, withdrawal adjustment base (WAB) logic, benefit determining percentage (BDP) logic, and annual lifetime payment (ALP) percentage logic. The processor is configured to execute the CV logic to determine a CV associated with the variable annuity contract, to execute the WAB logic to determine a WAB associated with the CV, to execute the BDP logic to calculate a BDP based on the CV and the WAB, and to execute the ALP percentage logic to compare the calculated BDP to a threshold BDP. A first ALP percentage is automatically selected when the calculated BDP satisfies the threshold BDP, and a second ALP percentage is automatically selected when the calculated BDP does not satisfy the threshold BDP.

Referring to FIG. 1, a particular illustrative embodiment of a system of the present disclosure is illustrated and generally designated 100. The system 100 includes an interface 102, a memory device 104, and a processor 106. The system 100 of FIG. 1 may enable adjustment of a guaranteed annual withdrawal amount associated with an investment product (e.g., a variable annuity contract that includes a guaranteed lifetime withdrawal benefit rider) based on multiple factors. For example, the guaranteed annual withdrawal amount may be reduced under certain conditions in order to reduce risk and hedge costs to a provider of the investment product. Further, a reduced guaranteed annual withdrawal amount may be advantageous to a client by allowing additional time for a contract value to recover. The cost savings to the provider associated with the reduced guaranteed annual withdrawal amount may be passed along to the investor in the form of reduced fees. Increasing the guaranteed annual withdrawal amount under other conditions may provide an "income bonus" to an owner of the investment product.

In the embodiment illustrated in FIG. 1, the interface 102 is configured to receive investment return information 108 associated with the investment product (e.g., a variable annuity contract) from an investment information source 110. The interface 102 is further configured to receive fee information 112 associated with the variable annuity contract from a fee information source 114. In the embodiment illustrated, the fee information 112 includes variable fee information. The interface 102 is further configured to receive withdrawal (W/D) information 116 associated with the variable annuity contract from a contract information source 118. For example, the withdrawal information 116 may include end of year (EOY) withdrawal information.

In the embodiment illustrated in FIG. 1, the memory device 104 is configured to store a plurality of annual lifetime payment (ALP) percentages 120. For example, the plurality of ALP percentages 120 may include at least a first ALP percentage 122 and a second ALP percentage 124. In the embodiment illustrated in FIG. 1, the plurality of ALP percentages 120 also includes a third ALP percentage 126. Alternatively, the plurality of ALP percentages 120 may include more than three selectable ALP percentages.

The memory device 104 is further configured to store at least one threshold benefit determining percentage (BDP) 128. In the embodiment illustrated in FIG. 1, the memory device 104 stores a first threshold BDP 130. Alternatively, the memory device 104 may store multiple threshold BDPs. The memory device 104 is further configured to store contract value (CV) logic 132, withdrawal adjustment base (WAB) logic 134, BDP logic 136, and ALP percentage logic 138.

The processor 106 is configured to execute the CV logic 132 to determine a CV associated with the investment product (e.g., a variable annuity contract), to execute the WAB logic 134 to determine a WAB, and to execute the BDP logic 136 to calculate a BDP based on the CV and the WAB. The processor 106 is further configured to execute the ALP percentage logic 138 to compare the calculated BDP to a threshold BDP. For example, in the embodiment illustrated in FIG. 1, the calculated BDP may be compared to the first threshold BDP 130. The ALP percentage logic 138 is configured to automatically select a particular ALP percentage (i.e., a selected ALP percentage 140) from the plurality of ALP percentages 120 based on the comparison. For example, the ALP percentage logic 138 may be configured to automatically select the first ALP percentage 122 when the calculated BDP satisfies the first threshold BDP 130 (e.g., when the calculated BDP is less than or equal to the first threshold BDP 130) and to automatically select the second ALP percentage 124 when the calculated BDP does not satisfy the first threshold BDP 130 (e.g., when the calculated BDP is greater than the first threshold BDP 130).

In operation, the CV logic 132 determines a first CV associated with the investment product. For example, the investment product may include a variable annuity contract, and a guaranteed lifetime withdrawal benefit rider may be associated with the variable annuity contract. In one embodiment, the first CV is a pre-withdrawal end of year CV (Pre-WD EOY CV). For example, the Pre-WD EOY CV may be calculated on a first anniversary date. Alternatively, the first CV may be calculated at any other time (i.e., not at the end of the year). The first CV may be determined based on multiple factors. In a particular illustrative embodiment, the first CV is determined based on the investment return information 108, the fee information 112, and the withdrawal information 116. Other factors may also be used in determining the first CV.

The WAB logic 134 determines a first WAB associated with the investment product. In a particular embodiment, a living benefit rider is associated with the variable annuity contract, and the first WAB may be calculated based on a predetermined formula defined in the living benefit rider. In a particular embodiment, the first WAB is a pre-withdrawal end of year WAB (Pre-WD EOY WAB) that is calculated when the Pre-WD EOY CV is calculated.

The BDP logic 136 calculates a first BDP based on the first CV and the first WAB. For example, the first BDP may be calculated based on the Pre-WD EOY CV and the Pre-WD EOY WAB. To illustrate, the first BDP may be calculated based on the formula [1−(Pre-WD EOY CV/Pre-WD EOY WAB)]*100 percent. The ALP percentage logic 138 compares the first calculated BDP to the first threshold BDP 130.

The ALP percentage logic 138 automatically selects the first ALP percentage 122 when the first calculated BDP satisfies the first threshold BDP 130 and automatically selects the second ALP percentage 124 when the first calculated BDP does not satisfy the first threshold BDP 130.

For example, in the embodiment illustrated in FIG. 1, the first threshold BDP 130 is twenty percent, and the first ALP percentage 122 (e.g., six percent) is greater than the second ALP percentage 124 (e.g., five percent). In this case, when the first calculated BDP is less than or equal to twenty percent, a guaranteed annual withdrawal amount 142 is determined based on the first ALP percentage 122 (e.g., six percent). When the first calculated BDP is greater than twenty percent, the guaranteed annual withdrawal amount 142 is determined based on the second ALP percentage 124 (e.g., five percent). In this example, the guaranteed annual withdrawal amount 142 may be reduced by one percentage point (i.e., from six percent to five percent) as a result of the first calculated BDP exceeding a threshold of twenty percent. Thus, the first threshold BDP 130 may represent a threshold that results in an adjustment of the guaranteed annual withdrawal amount 142. When the first calculated BDP is greater than the first threshold BDP 130, the guaranteed annual withdrawal amount 142 may be reduced. This may reduce risk and hedge costs to a provider of the investment product, particularly in down markets.

In alternative embodiments, the first threshold BDP 130, the first ALP percentage 122, and the second ALP percentage 124 may be different percentages. In one embodiment, the plurality of ALP percentages 120 may be determined based on an age of an owner of the investment product. For example, the first ALP percentage 122 may be four percent and the second ALP percentage 124 may be three percent when the owner is fifty years old. As another example, the first ALP percentage 122 may be five percent and the second ALP percentage 124 may be four percent when the owner is fifty nine years old. As another example, the first ALP percentage 122 may be six percent and the second ALP percentage 124 may be five percent when the owner is sixty five years old. As a further example, the first ALP percentage 122 may be seven percent and the second ALP percentage 124 may be six percent when the owner is eighty years old. The plurality of ALP percentages 120 may also be determined based on actuarial data. Thus, the above examples of ALP percentages associated with particular age groups may be modified according to the actuarial data that may change over time.

In alternative embodiments, the ALP percentage logic 138 may automatically select the third ALP percentage 126 when a calculated BDP is greater than a second threshold BDP (not shown) of the plurality of threshold BDPs 128. The second threshold BDP may be greater than the first threshold BDP 130, and the third ALP percentage 126 may be less than the second ALP percentage 124. To illustrate, the second threshold BDP may be thirty percent. In this case, when the calculated BDP is greater than thirty percent, the guaranteed annual withdrawal amount 142 is determined based on the third ALP percentage 126 (e.g., four percent). In alternative embodiments, the second threshold BDP and the third ALP percentage 126 may be different percentages. Thus, the second threshold BDP may represent a threshold that results in a different adjustment of the guaranteed annual withdrawal amount 142. In this example, the guaranteed annual withdrawal amount 142 may be reduced by two percentage points (i.e., from six percent to four percent) or by one percentage point (i.e., from five percent to four percent) as a result of the calculated BDP exceeding a threshold of thirty percent. This may further reduce risk and hedge costs to a provider of the investment product.

The CV logic 132 may further determine a second CV associated with the investment product. In one embodiment, the second CV is a second Pre-WD EOY CV. For example, the second Pre-WD EOY CV may be calculated on a second anniversary date (i.e., one year after the first anniversary date). Alternatively, the second CV may be calculated at any other time (i.e., not at the end of the year). The second CV may be determined based on multiple factors. In a particular illustrative embodiment, the second CV is determined based on the investment return information 108, the fee information 112, and the withdrawal information 116. Other factors may also be used in determining the second CV.

The WAB logic 134 may determine a second WAB associated with the investment product. In a particular embodiment, the second WAB is a second Pre-WD EOY WAB that is calculated when the second Pre-WD EOY CV is calculated. The BDP logic 136 may calculate a second BDP based on the second CV and the second WAB. For example, the second BDP may be calculated based on the second Pre-WD EOY CV and the second Pre-WD EOY WAB. The ALP percentage logic 138 may compare the second calculated BDP to the first threshold BDP 130. The ALP percentage logic 138 automatically selects the first ALP percentage 122 when the second calculated BDP is less than or equal to the first threshold BDP 130 and automatically selects the second ALP percentage 124 when the second calculated BDP is greater than the first threshold BDP 130.

The selected ALP percentage 140 may fluctuate between BDP calculations. For example, the first calculated BDP may result in a selection of the first ALP percentage 122, while the second calculated BDP may result in a selection of the second ALP percentage 124. Similarly, the first calculated BDP may result in a selection of the second ALP percentage 124, while the second calculated BDP may result in a selection of the first ALP percentage 122. As an example, in the case of a guaranteed benefit amount (GBA) of $100,000, the guaranteed annual withdrawal amount 142 may decrease from $6,000 to $5,000 on a first anniversary date and may return to $6,000 on the second anniversary date. As another example, the guaranteed annual withdrawal amount 142 may increase from $5,000 to $6,000 on the first anniversary date and may return to $5,000 on the second anniversary date.

A guaranteed lifetime withdrawal benefit rider may be associated with the variable annuity contract. The guaranteed lifetime withdrawal benefit rider may indicate that a fee associated with the variable annuity contract is adjustable and that an adjustment to the fee is declinable. The provider of the variable annuity contract may adjust the fees at any time for in-force contracts (up to a predefined maximum fee). A client may decline fee changes by giving up flexibility and features of the rider. Declining a fee change may "lock in" a current guarantee. To illustrate, if the client opts out of the fee change, the client may give up one or more features of the rider. For example, the client may give up the ability to make additional payments, future annual step ups, the ability to move to a more aggressive investment option, any increase to ALP percentage due to changing age bands, and future rider credits. In one embodiment, the client can terminate the rider if the fee increases by more than a certain amount (e.g. 0.25 percentage points).

The guaranteed lifetime withdrawal benefit rider may also include a principal back guarantee (PBG) that extends a remaining benefit to an owner or a beneficiary of the variable annuity contract until the PBG is depleted. This benefit may include principal invested or may be increased for "step-ups" and/or credits.

A living benefit rider may be associated with the variable annuity contract. The living benefit rider may define a waiting period. For example, the waiting period may be three years. The waiting period is the time when benefits are limited or decreased if withdrawals are taken. A withdrawal during the waiting period may set benefits associated with the variable annuity contract to zero until an end of the waiting period. Benefits may be re-established at the end of the waiting period based on a contract value at the end of the waiting period. Alternatively, the guaranteed annual withdrawal amount 142 may be fixed at a lower guaranteed annual withdrawal amount (e.g., based on the second ALP percentage 124 of five percent) in response to a withdrawal during the waiting period.

When the first ALP percentage 122 is selected, the guaranteed annual withdrawal amount 142 associated with the variable annuity contract may be automatically calculated based on the first ALP percentage 122. For example, a GBA associated with the variable annuity contract may be $100,000, and the guaranteed annual withdrawal amount 142 may be calculated as $6,000 (i.e., 6% of $100,000). When the second ALP percentage 124 is selected, the guaranteed annual withdrawal amount 142 associated with the variable annuity contract may be automatically calculated based on the second ALP percentage 124. For example, when the GBA associated with the variable annuity contract is $100,000, the guaranteed annual withdrawal amount 142 may be calculated as $5,000 (i.e., 5% of $100,000). Similarly, when the third ALP percentage 126 is selected, the guaranteed annual withdrawal amount 142 associated with the variable annuity contract may be calculated as $4,000. Certain consequences may result from a client withdrawing more than the guaranteed annual withdrawal amount 142 calculated according to the selected ALP percentage 140. For example, a benefit may be reduced proportional to the amount of the excess withdrawal. As another example, the selected ALP percentage 140 may be fixed at a lower ALP percentage (e.g., fixed at the second ALP percentage 124 of five percent) in response to a withdrawal in excess of the guaranteed annual withdrawal amount 142.

A payment may be selectively distributed to an owner of the variable annuity contract at a payment time (e.g., the payment may be automatically distributed or may be distributed in response to a request from the owner). When the first ALP percentage 122 (i.e., six percent) is selected and the GBA is $100,000, the payment is limited to the guaranteed annual withdrawal amount 142 of $6,000. When the second ALP percentage 124 (i.e., five percent) is selected and the GBA is $100,000, the payment is limited to the guaranteed annual withdrawal amount 142 of $5,000. When the third ALP percentage 126 (i.e., four percent) is selected and the GBA is $100,000, the payment is limited to the guaranteed annual withdrawal amount 142 of $4,000. The maximum payment amount may be automatically distributed to the owner (e.g., on the contract anniversary date), or a payment amount that is less than the maximum payment amount may be selected by the owner. One or more contract values associated with the variable annuity contract may be adjusted based on at least the distributed payment (i.e., based on the withdrawal information 116). The adjustment may be communicated to the contract information source 118.

Referring to FIG. 2, a chart 200 illustrates an example of an annual determination of an annual lifetime payment (ALP) amount based on a comparison of a calculated BDP to a threshold BDP. In the embodiment illustrated in FIG. 2, the ALP amount may be calculated based on a selected ALP percentage and a guaranteed benefit amount (GBA) at a time of purchase (e.g., a value of $100,000 that remains fixed during a waiting period). The chart 200 of FIG. 2 illustrates that when the calculated BDP exceeds the threshold BDP, a guaranteed annual withdrawal amount determined based on the ALP amount is reduced, and when the calculated BDP does not exceed the threshold BDP, the guaranteed annual withdrawal amount based on the ALP amount is increased. Further, FIG. 2 illustrates that the guaranteed annual withdrawal amount may vary over time as a result of market conditions. A reduced guaranteed annual withdrawal amount may reduce risk and hedge costs to a provider of an investment product. Further, the reduced guaranteed annual withdrawal amount may be advantageous to the client by allowing additional time for the contract value to recover in order to increase the guaranteed annual withdrawal amount to the higher guaranteed annual withdrawal amount. An increased guaranteed annual withdrawal amount may provide an "income bonus" to an owner of the investment product.

The chart 200 provides illustrative examples of data associated with an investment product (e.g., a variable annuity contract) for a plurality of years 202. In the embodiment illustrated, ten years of sample data are provided. In the example illustrated, an attained age 204 of an owner of the contract is 62 in the first contract year, and the attained age 204 of the owner of the contract is 71 in the tenth year. For each of the plurality of years 202, the sample data includes a net return 206 (i.e., a percentage), an EOY gross WD amount 208, an EOY WAB 210, an EOY BDP 212, a withdrawal percentage 214 (i.e., an ALP percentage), an EOY CV 216, a guaranteed benefit amount (GBA) 218, a guaranteed benefit payment (GBP) 220, an ALP 222, and an EOY remaining benefit amount (RBA) 224.

In the embodiment illustrated in FIG. 2, withdrawals begin after a waiting period of three years. Accordingly, in FIG. 2, the EOY gross WD amount 208 in the first three years is zero.

The EOY CV 216 may be determined based on a combination of an investment return and a fee associated with the investment product (i.e., the net return 206). For example, prior to any withdrawals, the EOY CV 216 associated with an investment product with an initial value of $100,000 may be $92,000 based on the net return 206 of negative 8% (e.g., in the first year of FIG. 2).

The EOY BDP 212 may be calculated based on the EOY CV 216 and the EOY WAB 210. To illustrate, when the EOY CV 216 is $92,000 (i.e., in the first year) and the EOY WAB 210 is $100,000, the EOY BDP 212 may be calculated based on the formula [1−($92,000/$100,000)]*100 percent, resulting in a calculated EOY BDP 212 of eight percent. When a threshold BDP is twenty percent, the withdrawal percentage 214 (i.e., the selected ALP percentage) may be higher because the calculated EOY BDP 212 (i.e., eight percent) is less than or equal to the threshold BDP of twenty percent. For example, in FIG. 2, the withdrawal percentage 214 is six percent when the calculated EOY BDP 212 is less than or equal to the threshold BDP of twenty percent while the withdrawal percentage 214 is five percent when the calculated EOY BDP 212 is greater than twenty percent. To illustrate, in the fifth year (i.e., when the EOY BDP 212 is 15.9%), the ALP 222 is calculated to be $6,000 based on the withdrawal percentage 214 of six percent and the GBA 218 of $100,000. For example, the ALP 222 may be the guaranteed annual withdrawal amount 142 of FIG. 1. In the embodiment illustrated in FIG. 2, it is assumed that a payment of $6,000 is made to the client. As a result, the contract information source 118 of FIG. 1 may be updated, and the withdrawal information 116 in subsequent years may reflect the payment of $6,000. In FIG. 2, the EOY CV 216 and the EOY RBA 224 reflect such withdrawals.

FIG. 2 also illustrates that when the EOY BDP 212 is greater than a threshold BDP of twenty percent, the withdrawal percentage 214 may be lower. For example, in the fourth year, the withdrawal percentage 214 is five percent because the EOY BDP 212 is greater than the threshold BDP of twenty percent (i.e., the EOY BDP 212 is 22.1% in the fourth year). In this case, the ALP 222 is calculated to be $5,000 based on the withdrawal percentage 216 of five percent and the GBA 218 of $100,000. Thus, FIG. 2 illustrates that the guaranteed annual withdrawal amount may vary over time depending on market conditions, potentially providing benefits to both the provider of the investment product and the owner of the investment product. As shown in FIG. 2, the ALP 222 may be locked for one contract year 202 at a time, potentially varying from year to year.

Referring to FIG. 3, a chart 300 illustrates another example of an annual determination of an ALP amount based on a comparison of a calculated BDP to a threshold BDP. In the embodiment illustrated in FIG. 3, the ALP amount may be calculated based on a selected ALP percentage and an EOY benefit base (BB) that may vary based on at least one "step up" in value during a waiting period. A reduced guaranteed annual withdrawal amount may reduce risk and hedge costs to a provider of an investment product. Further, the reduced guaranteed annual withdrawal amount may be advantageous to the client by allowing additional time for the contract value to recover in order to increase the guaranteed annual withdrawal amount to the higher amount. An increased guaranteed annual withdrawal amount may provide an "income bonus" to an owner of the investment product.

The chart 300 provides illustrative examples of data associated with an investment product (e.g., a variable annuity contract) for each year of a plurality of years 302. In the embodiment illustrated, ten years of sample data are provided. In the example illustrated, an attained age 304 of an owner of the contract is 65 in the first contract year, and the attained age 304 of the owner of the contract is 74 in the tenth year. For each year 302, the sample data includes a net return 306 (i.e., a percentage), an EOY gross WD amount 208, an EOY WAB 210, an EOY BDP 212, a withdrawal percentage 214 (i.e., an ALP percentage), an EOY CV 216, an ALP 222, and an EOY benefit base (BB) 326.

In the embodiment illustrated in FIG. 3, the EOY WAB 310 and the EOY BB 326 increase each year during the waiting period of three years, independent of the net return 304 in those years. In this case, the client is receiving a credit that increases the guarantee for each year that a withdrawal is not taken. In this example, the EOY WAB 310 and the EOY BB 326 increase by $8,000 in the first year, resulting in a value of $108,000 based on an initial contract value of $100,000. Thus, the EOY WAB 310 and the EOY BB 326 both increase despite the net return 306 of negative 10% in the first year. Similarly, the EOY WAB 310 and the EOY BB 326 increase by $6,000 in the second year despite the net return 306 of negative 10% in the second year. The EOY WAB 310 and the EOY BB 326 also increase by $6,000 in the third year (in this case, when the net return 306 is positive).

In the embodiment illustrated in FIG. 3, the net return 306 varies by year 302, and withdrawals begin after a waiting period of three years. The EOY CV 316 may be determined based on a combination of an investment return and a fee associated with the investment product (i.e., the net return 306). For example, prior to any withdrawals, the EOY CV 316 associated with an investment product with an initial value of $100,000 may be $90,000 based on the net return 306 of negative ten percent (e.g., in the first year 302 of FIG. 3). As explained above, the EOY BDP 312 may be calculated based on the EOY CV 316 and the EOY WAB 310. To illustrate, when the EOY CV 316 is $90,000 (i.e., in the first year) and the EOY WAB 310 is $108,000, the EOY BDP 312 may be calculated based on the formula [1−($90,000/$108,000)]*100 percent, resulting in a calculated EOY BDP 312 of 16.7 percent. Based on a threshold BDP of twenty percent, the selected withdrawal percentage 314 is higher (i.e., six percent versus five percent).

In the embodiment illustrated in FIG. 3, the ALP 322 is determined based on the withdrawal percentage 314 and the EOY BB 326. As a result of the increase in value of the EOY BB 322 during the waiting period, the ALP 322 may also increase. As an example, in the fourth year, the withdrawal percentage 314 is six percent, and the ALP 322 is calculated to be $7,200 (i.e., six percent of $120,000). When the withdrawal percentage 314 is five percent, the ALP is calculated to be $6,000. Thus, FIG. 3 illustrates an alternative method of determining a guaranteed annual withdrawal amount that utilizes a "benefit base" amount.

Figure 4:
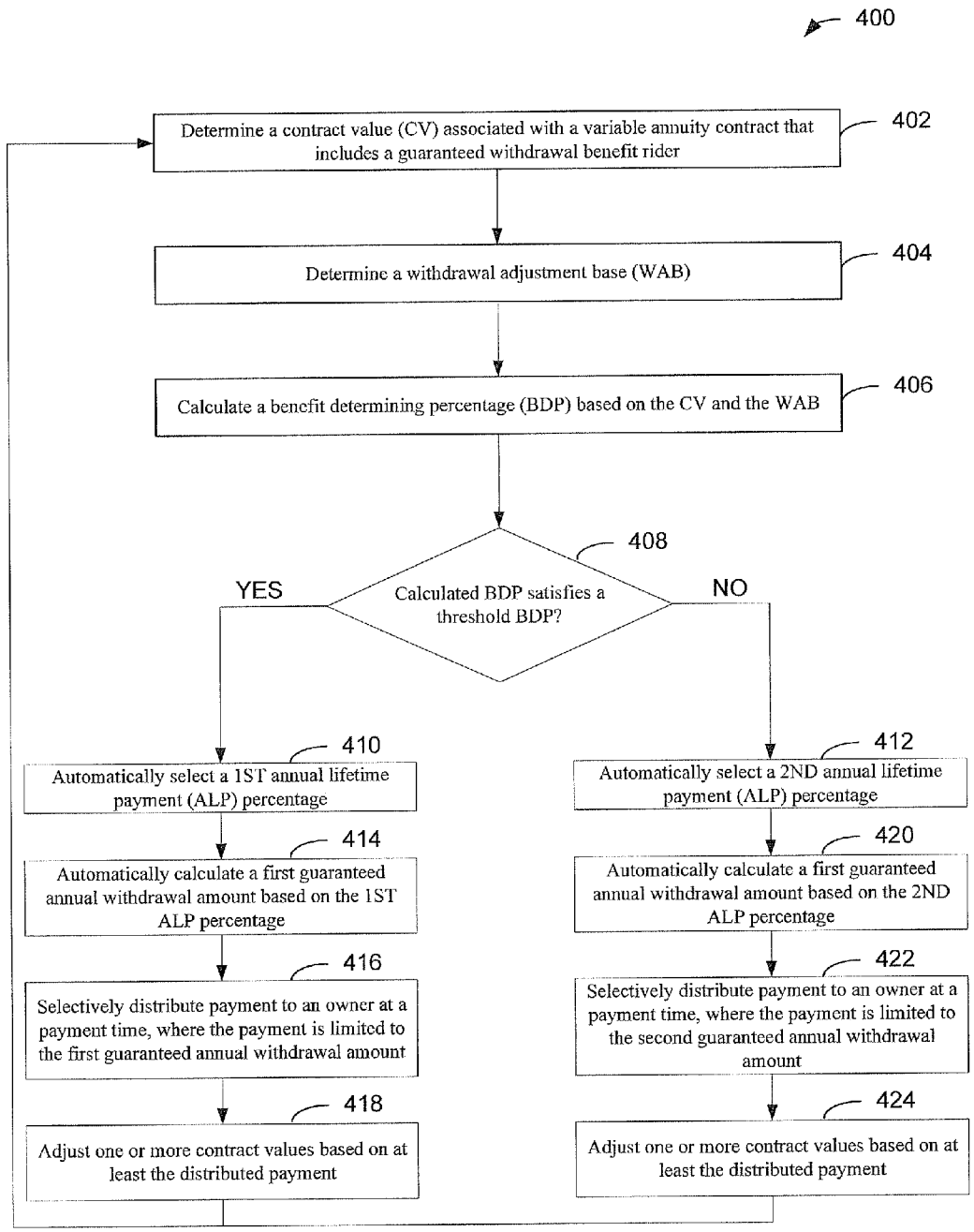
FIG. 4 is a flow diagram to illustrate a particular embodiment of a method of automatically calculating a guaranteed annual withdrawal amount associated with an investment product based on a comparison of a calculated BDP to a threshold BDP.

Referring to FIG. 4, a particular embodiment of a method of automatically calculating a guaranteed annual withdrawal amount associated with an investment product based on a comparison of a calculated BDP to a threshold BDP is illustrated and generally designated 400.

The method 400 includes determining a contract value (CV) associated with an investment product (e.g., a variable annuity contract that includes a guaranteed withdrawal benefit rider), at 402. For example, the CV logic 132 of the system 100 of FIG. 1 may determine the CV associated with the investment product. The method 400 includes determining a withdrawal adjustment base (WAB) associated with the investment product, at 404. For example, the WAB logic 134 of the system 100 of FIG. 1 may determine the WAB associated with the investment product.

The method 400 includes calculating a benefit determining percentage (BDP) based on the CV and the WAB, at 406. For example, the WAB logic 134 of the system 100 of FIG. 1 may calculate the BDP based on the CV and the WAB. The method 400 includes determining whether the calculated BDP satisfies a threshold BDP, at 408. For example, the ALP percentage logic 138 of the system 100 of FIG. 1 may determine whether the calculated BDP satisfies the first threshold BDP 130.

When the calculated BDP satisfies the threshold BDP (e.g., when the calculated BDP is less than or equal to the threshold BDP), the method 400 includes automatically selecting a first ALP percentage, at 410. For example, when the calculated BDP is less than or equal to the first threshold BDP 130 of FIG. 1, the ALP percentage logic 138 automatically selects the first ALP percentage 122 (i.e., six percent). When the calculated BDP does not satisfy the threshold BDP (e.g., when the calculated BDP is greater than the threshold BDP), the method 400 includes automatically selecting a second ALP percentage, at 412. For example, when the calculated BDP is greater than the first threshold BDP 130 of FIG. 1, the ALP percentage logic 138 automatically selects the second ALP percentage 124 (i.e., five percent).

When the first ALP percentage is selected, the method 400 includes automatically calculating a first guaranteed annual withdrawal amount based on the first ALP percentage, at 414. For example, the guaranteed annual withdrawal amount 142 of FIG. 1 may be automatically calculated based on the first ALP percentage 122 (i.e., six percent). The method 400 further includes selectively distributing a payment to an owner of the variable annuity contract at a payment time, where the payment is limited to the first guaranteed annual withdrawal amount, at 416. For example, the payment may be limited to $6,000 assuming a GBA of $100,000 and a first ALP percentage of six percent. The method 400 further includes adjusting one or more contract values based on at least the distributed payment, at 418. For example, an adjustment of $6,000 may be communicated to the contract information source 118 of FIG. 1 in the event that the owner receives the maximum payment of $6,000.

When the second ALP percentage is selected, the method 400 includes automatically calculating a second guaranteed annual withdrawal amount based on the second ALP percentage, at 420. For example, the guaranteed annual withdrawal amount 142 of FIG. 1 may be automatically calculated based on the second ALP percentage 124 (i.e., five percent). The method 400 further includes selectively distributing a payment to the owner at the payment time, where the payment is limited to the second guaranteed annual withdrawal amount, at 422. For example, the payment may be limited to $5,000 assuming a GBA of $100,000 and a second ALP percentage of five percent. The method 400 further includes adjusting one or more contract values associated with the variable annuity contract based on at least the distributed payment, at 424. For example, an adjustment of $5,000 may be communicated to the contract information source 118 of FIG. 1 in the event that the owner receives the maximum payment of $5,000. In the embodiment shown in FIG. 4, the method 400 may repeat by returning to 402 to calculate a contract value at a subsequent time.

By reducing the guaranteed annual withdrawal amount associated with an investment product under certain conditions, the method 400 of FIG. 4 may reduce risk and hedge costs to a provider of the investment product. Further, by selecting an increased ALP percentage under certain conditions, the method 400 of FIG. 4 may allow the owner of the variable annuity contract to receive a higher annual income.

Figure 5:
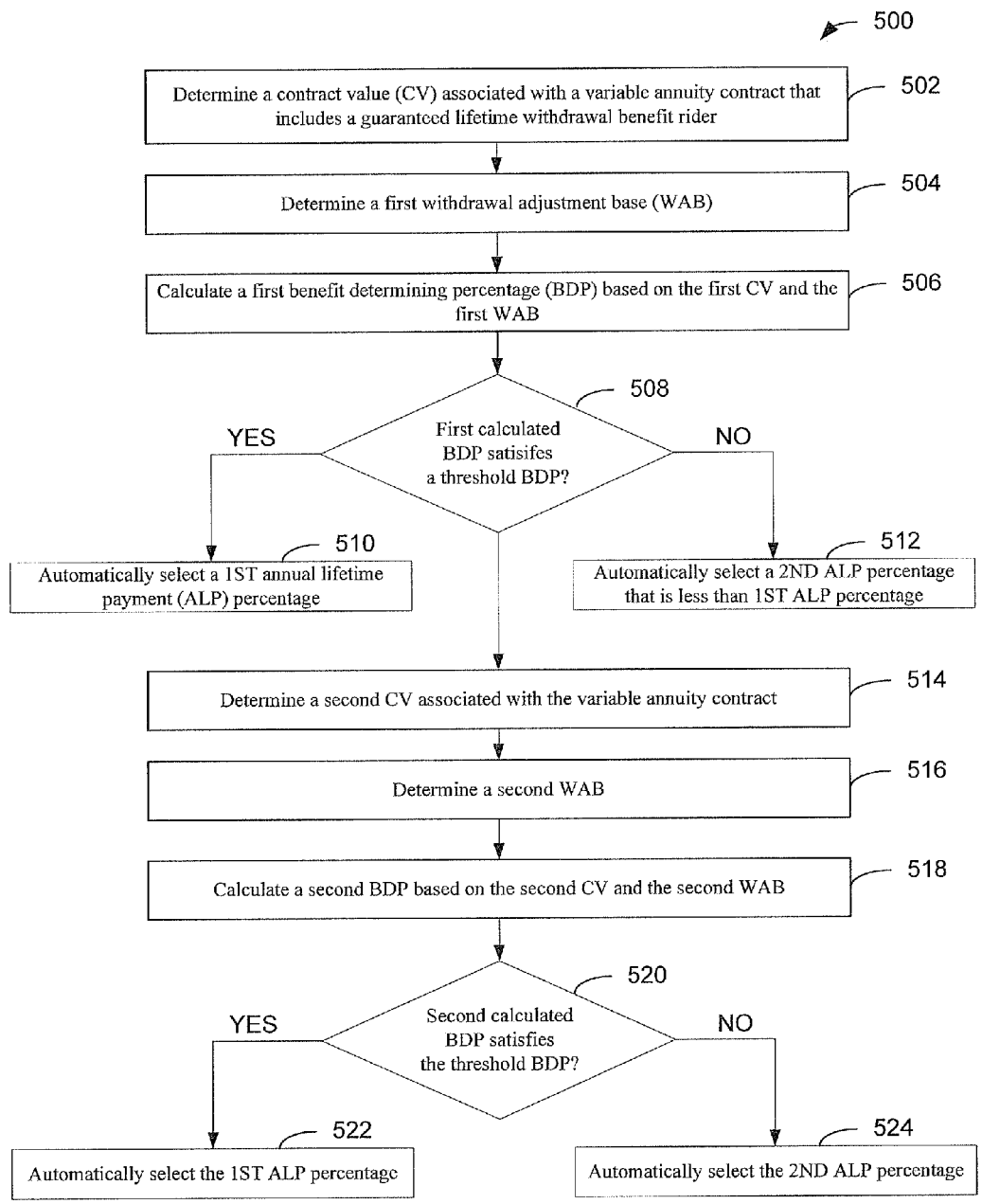
FIG. 5 is a flow diagram to illustrate a particular embodiment of a method of automatically selecting an ALP percentage based on a comparison of a calculated BDP to a threshold BDP.

Referring to FIG. 5, a particular embodiment of a method of automatically selecting an ALP percentage based on a comparison of a calculated BDP to a threshold BDP over multiple calculation periods is illustrated and generally designated 500.

The method 500 includes determining a first contract value (CV) associated with a variable annuity contract, where a guaranteed lifetime withdrawal benefit rider is associated with the variable annuity contract, at 502. For example, the CV logic 132 of the system 100 of FIG. 1 may determine the first CV associated with the variable annuity contract on a first anniversary date. The method 500 includes determining a first withdrawal adjustment base (WAB), at 504. For example, the WAB logic 134 of the system 100 of FIG. 1 may determine the first WAB on the first anniversary date.

The method 500 includes calculating a first benefit determining percentage (BDP) based on the first CV and the first WAB, at 506. For example, the WAB logic 134 of the system 100 of FIG. 1 may calculate the first BDP based on the first CV and the first WAB. The method 500 includes determining whether the first calculated BDP satisfies a threshold BDP, at 508. For example, the ALP percentage logic 138 of the system 100 of FIG. 1 may determine whether the first calculated BDP satisfies the first threshold BDP 130.

When the first calculated BDP satisfies the threshold BDP (e.g., when the first calculated BDP is less than or equal to the threshold BDP), the method 500 includes automatically selecting a first ALP percentage, at 510. For example, when the first calculated BDP is less than or equal to the first threshold BDP 130 of FIG. 1, the ALP percentage logic 138 automatically selects the first ALP percentage 122. When the first calculated BDP does not satisfy the threshold BDP (e.g., when the first calculated BDP is greater than the threshold BDP), the method 500 includes automatically selecting a second ALP percentage that is less than the first ALP percentage, at 512. For example, when the first calculated BDP is greater than the first threshold BDP 130 of FIG. 1, the ALP percentage logic 138 automatically selects the second ALP percentage 124. In the embodiment illustrated in FIG. 1, the second ALP percentage 124 (i.e., five percent) is less than the first ALP percentage 122 (i.e., six percent).

The method 500 further includes determining a second CV associated with the variable annuity contract, at 514. For example, the CV logic 132 of the system 100 of FIG. 1 may determine the second CV associated with the variable annuity contract on a second anniversary date. The method 500 includes determining a second WAB, at 516. For example, the WAB logic 134 of the system 100 of FIG. 1 may determine the second WAB on the second anniversary date.

The method 500 includes calculating a second BDP based on the second CV and the second WAB, at 518. For example, the WAB logic 134 of the system 100 of FIG. 1 may calculate the second BDP based on the second CV and the second WAB. The method 500 includes determining whether the second calculated BDP satisfies the threshold BDP, at 520. For example, the ALP percentage logic 138 of the system 100 of FIG. 1 may determine whether the second calculated BDP is greater than the first threshold BDP 130.

When the second calculated BDP satisfies the threshold BDP, the method 500 includes automatically selecting a first ALP percentage, at 522. For example, when the second calculated BDP is less than or equal to the first threshold BDP 130 of FIG. 1, the ALP percentage logic 138 automatically selects the first ALP percentage 122. When the second calculated BDP does not satisfy the threshold BDP, the method 500 includes automatically selecting the second ALP percentage, at 524. For example, when the second calculated BDP is greater than the first threshold BDP 130 of FIG. 1, the ALP percentage logic 138 automatically selects the second ALP percentage 124.

The method 500 of FIG. 5 may reduce risk and hedge costs to a provider of a variable annuity contract by selecting a reduced ALP percentage associated with the variable annuity contract under certain conditions. A reduced ALP percentage may benefit the client by increasing the likelihood of contract value recovery (i.e., as a result of less money being withdrawn when the contract value is low). Further, the reduced ALP percentage may increase the likelihood of step-ups over time. Further, by selecting an increased ALP percentage under certain conditions, the method 500 of FIG. 5 may allow the owner of the variable annuity contract to receive a higher annual income. As such, allowing the ALP percentage to vary over time may provide benefits to both the provider of the variable annuity contract and to the owner of the variable annuity contract.

Figure 6:
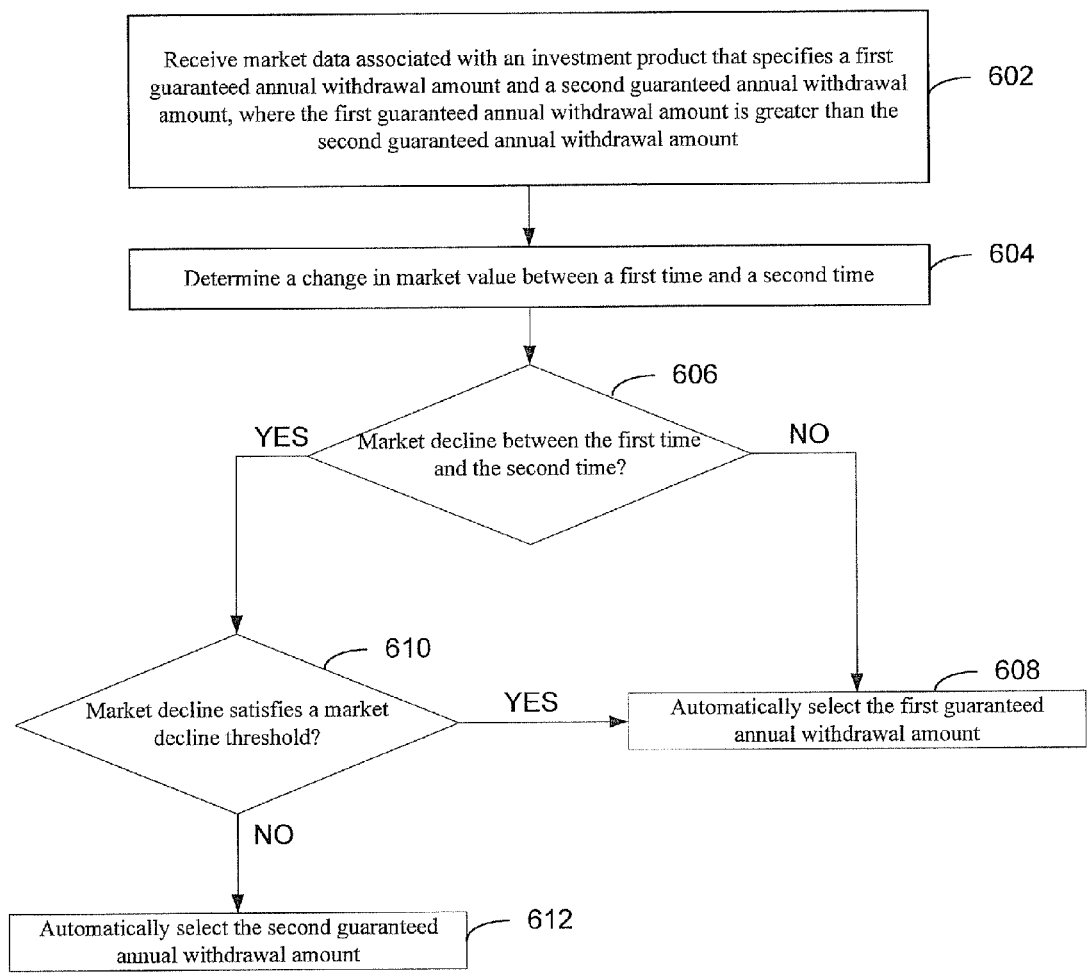
FIG. 6 is a flow diagram to illustrate a particular embodiment of a method of automatically selecting a guaranteed annual withdrawal amount associated with an investment product based on at least an evaluation of market data.

Referring to FIG. 6, a particular embodiment of a method of automatically selecting a guaranteed annual withdrawal amount specified in a guaranteed withdrawal benefit rider based on at least an evaluation of market data is illustrated and generally designated 600. For example, a variable annuity contract may include a living benefit rider (i.e., a guaranteed lifetime withdrawal benefit rider). In a particular embodiment, the method 600 of FIG. 6 may be performed by the system 100 of FIG. 1.

The method 600 includes receiving market data associated with the investment product, at 602. A guaranteed withdrawal benefit rider specifies a first guaranteed annual withdrawal amount and a second guaranteed annual withdrawal amount, where the first guaranteed annual withdrawal amount is greater than the second guaranteed annual withdrawal amount. For example, the guaranteed annual withdrawal amount 142 of FIG. 1 may represent either the first guaranteed annual withdrawal amount or the second guaranteed annual withdrawal amount.

The method 600 includes determining a change in market value associated with the investment product between a first time and a second time, at 604. The method 600 further includes determining whether there was a market decline between the first time and the second time, at 606. For example, the system 100 of FIG. 1 may determine the change in market value and determine whether there was a market decline based on the investment return information 108 received from the investment information source 110. To illustrate, the investment product may be associated with an index fund that tracks a market index (e.g., the Standard & Poor's (S&P) 500 index, the Nasdaq-100 index, or another market index). In this case, the system 100 of FIG. 1 may determine whether there was a market decline associated with the particular market index between the first time and the second time. Alternatively, the investment product may be associated with other investments (e.g., stocks, bonds, mutual funds, among other alternatives). In this case, the system 100 of FIG. 1 may determine whether there was a market decline associated with the particular investments associated with the investment product between the first time and the second time.

When there was not a market decline between the first time and the second time, the method 600 includes automatically selecting the first guaranteed annual withdrawal amount (i.e., a higher annual income amount), at 608. For example, in FIG. 1, the guaranteed annual withdrawal amount 142 may be a higher guaranteed annual withdrawal amount when there was not a market decline. When there was a market decline between the first time and the second time, the method 600 includes determining whether the market decline satisfies a market decline threshold, at 610. For example, the market decline threshold may be stored at the memory device 104 of the system 100 of FIG. 1, and the CV logic 132 may determine whether the market decline satisfies the market decline threshold. For example, the market decline may satisfy the market decline threshold when the market decline does not exceed a market decline threshold. When the market decline satisfies the market decline threshold, the method 600 includes automatically selecting the first guaranteed annual withdrawal amount (i.e., the higher annual income amount), at 608. When the market decline does not satisfy the market decline threshold (e.g., when the market decline exceeds the market decline threshold), the method 600 includes automatically selecting the second guaranteed annual withdrawal amount (i.e., a lower annual income amount), at 612. The method 600 of FIG. 6 may be performed multiple times in order to determine the guaranteed annual withdrawal amount over time.

Figure 7:
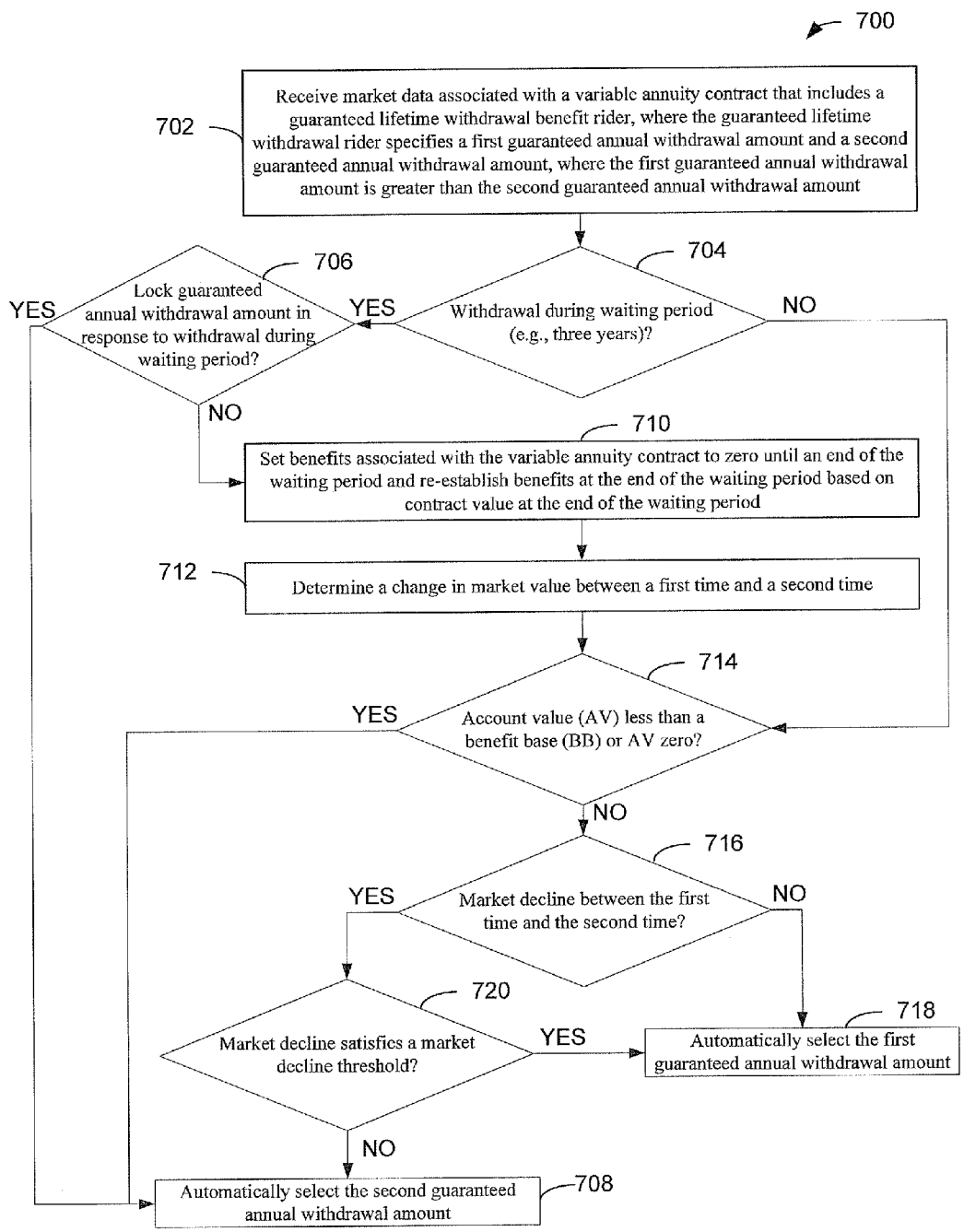
FIG. 7 is a flow diagram to illustrate a second particular embodiment of a method of automatically selecting a guaranteed annual withdrawal amount specified in a guaranteed lifetime withdrawal benefit rider associated with a variable annuity contract based on at least an evaluation of market data.

Referring to FIG. 7, a second particular embodiment of a method of automatically selecting a guaranteed annual withdrawal amount specified in a guaranteed lifetime withdrawal benefit rider associated with a variable annuity contract based on at least an evaluation of market data is illustrated and generally designated 700. In a particular embodiment, the method 700 of FIG. 7 may be performed by the system 100 of FIG. 1.

The method 700 includes receiving market data associated with the variable annuity contract, at 702. The guaranteed lifetime withdrawal benefit rider (i.e., a living benefit rider) associated with the variable annuity contract specifies a first guaranteed annual withdrawal amount and a second guaranteed annual withdrawal amount, where the first guaranteed annual withdrawal amount is greater than the second guaranteed annual withdrawal amount. For example, the guaranteed annual withdrawal amount 142 of FIG. 1 may represent either the first guaranteed annual withdrawal amount or the second guaranteed annual withdrawal amount. Further, the living benefit rider defines a waiting period. In a particular embodiment, the waiting period is three years.

The method 700 includes determining whether a withdrawal was made during the waiting period (i.e., three years after an initial contract date), at 704. When no withdrawal was made, the method 700 proceeds to 714. When a withdrawal was made during the waiting period, the method 700 includes determining whether the living benefit rider locks the guaranteed annual withdrawal amount in response to the withdrawal during the waiting period, at 706. When the living benefit rider locks the guaranteed annual withdrawal amount, the method 700 includes automatically selecting the second guaranteed annual withdrawal amount (i.e., the lower annual income amount), at 708. In this case, the guaranteed annual withdrawal amount 142 of FIG. 1 represents the lower annual income amount, and the higher guaranteed annual withdrawal amount may no longer be available as a result of the withdrawal during the waiting period.

When the living benefit rider does not lock the guaranteed annual withdrawal amount in response to the withdrawal during the waiting period, the method 700 includes setting benefits associated with the variable annuity contract to zero until an end of the waiting period and re-establishing benefits at the end of the waiting period based on contract value at the end of the waiting period, at 710. The method 700 further includes determining a change in market value between a first time and a second time, at 712, and determining whether an account value (AV) is less than a benefit base (BB) or whether the AV is zero, at 714. When the AV is less than the BB or the AV is zero, the method 700 includes automatically selecting the second guaranteed annual withdrawal amount (i.e., the lower annual income amount), at 708. When the AV is not less than the BB and the AV is not zero, the method 700 includes determining whether there was a market decline between the first time and the second time, at 716. To illustrate, the variable annuity contract may be associated with an index fund that tracks a market index (e.g., the Standard & Poor's (S&P) 500 index, the Nasdaq-100 index, or another market index). In this case, the system 100 of FIG. 1 may determine whether there was market decline associated with the particular market index between the first time and the second time. Alternatively, the variable annuity contract may be associated with other investments (e.g., stocks, bonds, mutual funds, among other alternatives). In this case, the system 100 of FIG. 1 may determine whether there was a market decline associated with the particular investments associated with the variable annuity contract between the first time and the second time.

When there was not a market decline between the first time and the second time, the method 700 includes automatically selecting the first guaranteed annual withdrawal amount (i.e., the higher annual income amount), at 718. For example, in FIG. 1, the guaranteed annual withdrawal amount 142 may be a higher annual income amount when there was not a market decline. When there was a market decline between the first time and the second time, the method 700 includes determining whether the market decline satisfies a market decline threshold, at 720. For example, the market decline threshold may be stored at the memory device 104 of the system 100 of FIG. 1, and the CV logic 132 may determine whether the market decline satisfies the market decline threshold. When the market decline satisfies the market decline threshold, the method 700 includes automatically selecting the first guaranteed annual withdrawal amount (i.e., the higher annual income amount), at 718. When the market decline does not satisfy the market decline threshold, the method 700 includes automatically selecting the second guaranteed annual withdrawal amount (i.e., the lower annual income amount), at 708.

Figure 8:
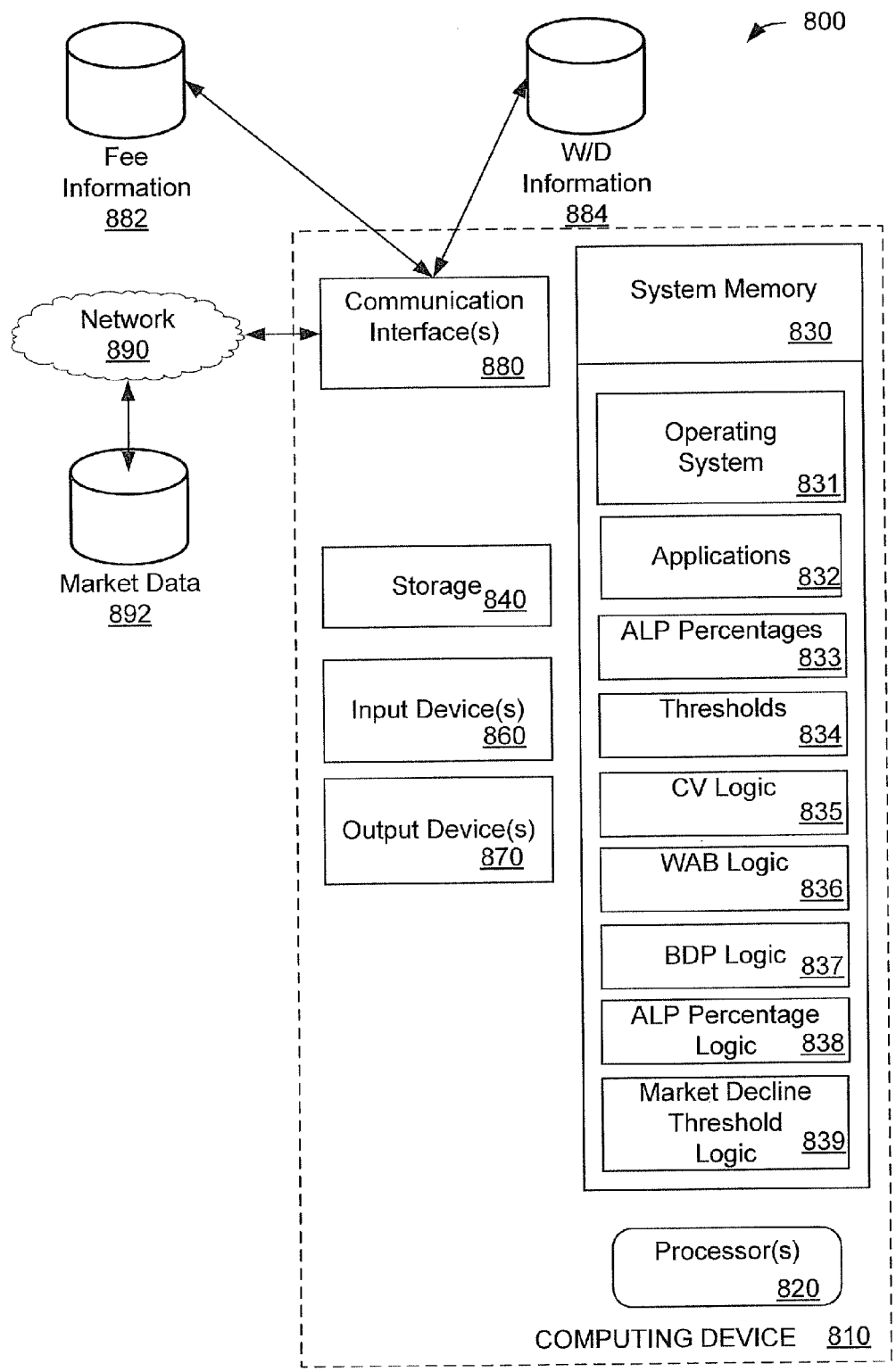
FIG. 8 is a block diagram of an illustrative computing environment including a computing device operable to support embodiments of computer-implemented methods, computer program products, and system components to implement the strategies, methods, and rules as illustrated in FIGS. 1-7.

FIG. 8 shows a block diagram of a computing environment 800 including a representative computing device 810 operable to support embodiments of computer-implemented methods, computer program products, and system components to implement the strategies, methods, and rules as illustrated in FIGS. 1-7. In an illustrative embodiment, the computing device 810 may implement one or more of the components of the system 100 of FIG. 1.

The computing device 810 includes at least one processor 820 and a system memory 830. The system memory 830 may correspond to the memory device 104 of FIG. 1. Depending on the configuration and type of the computing device 810, the system memory 830 may be volatile (such as random access memory or "RAM"), non-volatile (such as read-only memory or "ROM," and similar memory devices that maintain stored data even when power is not provided) or some combination of the two. The system memory 830 typically includes an operating system 831 and one or more applications 832. Alternatively, the applications 832 may be located at multiple computing devices, where the multiple computing devices are part of a distributed computing system. In this case, one or more of the multiple computing devices of the distributed system may comprise the representative computing device 810.

In the embodiment illustrated in FIG. 8, the system memory 830 also includes a plurality of ALP percentages 833, one or more thresholds 834, CV logic 835, WAB logic 836, BDP logic 837, and ALP percentage logic 838. The plurality of ALP percentages 833 may correspond to the plurality of ALP percentages 120 of FIG. 1, the one or more thresholds 834 may correspond to the at least one threshold BDP 128, the CV logic 835 may correspond to the CV logic 132, the WAB logic 836 may correspond to the WAB logic 134, the BDP logic 837 may correspond to the BDP logic 136, and the ALP percentage logic 838 may correspond to the ALP percentage logic 138. The system memory 830 may also include market decline threshold logic 839 to determine whether there was a market decline between a first time and a second time based on data from a market data source 892 and to determine whether the market decline satisfies a market decline threshold. In this case, the market decline threshold may be stored as one of the one or more thresholds 834.

The computing device 810 may also have additional features or functionality. For example, the computing device 810 may also include removable and/or non-removable data storage devices such as magnetic disks, optical disks, tape, and memory cards. Such additional storage is illustrated in FIG. 8 by storage 840. Computer storage media may include volatile and/or non-volatile storage and removable and/or non-removable media implemented in any method or technology for storage of information such as computer-readable instructions, data structures, program components or other data. The system memory 830 and the storage 840 are examples of computer storage media. The computer storage media includes, but is not limited to, RAM, ROM, electrically erasable programmable read-only memory (EEPROM), or other memory technology, compact disks (CD), digital versatile disks (DVD) or other optical storage, magnetic cassettes, magnetic tape, magnetic disk storage or other magnetic storage devices, or any other tangible non-transitory medium that can be used to store information and that can be accessed by computing device 810. Any such computer storage media may be part of the computing device 810. The computing device 810 may also have input device(s) 860, such as a keyboard, mouse, pen, voice input device, touch input device, etc. Output device(s) 870, such as a display, speakers, a printer, etc. may also be included.

The computing device 810 also includes one or more communication interfaces 880 that allow the computing device 810 to communicate with one or more information sources. For example, the computing device 810 may communicate with a fee information source 882, a withdrawal information source 884, and the market data source 892. In the embodiment illustrated, the market data source 892 is accessible via a network 890. Alternatively, the market data source 892 may be locally accessible to the computing device 810. The fee information source 882 may correspond to the fee information source 114 of FIG. 1, the withdrawal information source 884 may correspond to the contract information source 118, and the market data source 892 may correspond to the investment information source 110.

The communication interfaces 880 are an example of communication media. By way of example, and not limitation, communication media may include wired media such as a wired network or direct-wired connection, and wireless media, such as acoustic, radio frequency (RF), infrared and other wireless media. It will be appreciated that not all of the components or devices illustrated in FIG. 8 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), read only memory (ROM), registers, a hard disk, a removable disk, a CD-ROM, or any other form of storage medium. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims, and their equivalents.

What is claimed is:

1. A computer-readable storage medium, comprising instructions that, when executed by a processor, cause the processor to:
   determine a contract value (CV) associated with a variable annuity contract, wherein a guaranteed withdrawal benefit rider is associated with the variable annuity contract;
   determine a withdrawal adjustment base (WAB) associated with the variable annuity contract;
   calculate a benefit determining percentage (BDP) based on the CV and the WAB;
   automatically select a first annual lifetime payment (ALP) percentage when the calculated BDP satisfies a first threshold BDP; and
   automatically select a second ALP percentage when the calculated BDP does not satisfy the first threshold BDP.

2. The computer-readable storage medium of claim 1, wherein the first ALP percentage is greater than the second ALP percentage.

3. The computer-readable storage medium of claim 2, wherein the first threshold BDP is twenty percent, wherein the first ALP percentage is six percent, and wherein the second ALP percentage is five percent.

4. The computer-readable storage medium of claim 2, further comprising instructions that, when executed by the processor, cause the processor to automatically select a third ALP percentage when the calculated BDP does not satisfy a second threshold BDP, wherein the second threshold BDP is greater than the first threshold BDP, and wherein the third ALP percentage is less than the second ALP percentage.

5. The computer-readable storage medium of claim 2, wherein the first ALP percentage and the second ALP percentage are determined based on an age of an owner of the investment product.

6. The computer-readable storage medium of claim 5, wherein the first ALP percentage is four percent and the second ALP percentage is three percent when the owner is fifty years old, wherein the first ALP percentage is five percent and the second ALP percentage is four percent when the owner is fifty nine years old, wherein the first ALP percentage is six percent and the second ALP percentage is five percent when the owner is sixty five years old, and wherein the first ALP percentage is seven percent and the second ALP percentage is six percent when the owner is eighty years old.

7. The computer-readable storage medium of claim 1, wherein the guaranteed withdrawal benefit rider includes a guaranteed lifetime withdrawal benefit rider, wherein the guaranteed lifetime withdrawal benefit rider indicates that a fee associated with the variable annuity contract is adjustable and that an adjustment to the fee is declinable, and wherein declining the adjustment to the fee results in removal of one or more rider features, the one or more rider features including an ability to make additional payments, one or more future annual step-ups, an ability to change to a more aggressive investment option, one or more increases to ALP percentage due to changing age bands, and an option to receive future rider credits.

8. The computer-readable storage medium of claim 1, wherein the guaranteed withdrawal benefit rider includes a guaranteed lifetime withdrawal benefit rider, and wherein the guaranteed lifetime withdrawal benefit rider includes a principal back guarantee (PBG) that extends a remaining benefit to an owner or a beneficiary of the variable annuity contract until the PBG is depleted.

9. The computer-readable storage medium of claim 1, further comprising instructions that, when executed by the processor, cause the processor to:
   automatically calculate a first guaranteed annual withdrawal amount associated with the variable annuity contract based on the first ALP percentage upon selection of the first ALP percentage;
   automatically distribute a first payment to an owner of the variable annuity contract at a first payment time, wherein the first distributed payment is limited to the first guaranteed annual withdrawal amount; and
   adjust one or more contract values associated with the variable annuity contract based on at least the first distributed payment.

10. The computer-readable storage medium of claim 9, further comprising instructions that, when executed by the processor, cause the processor to:
   automatically calculate a second guaranteed annual withdrawal amount associated with the variable annuity contract based on the second ALP percentage upon selection of the second ALP percentage;

automatically distribute a second payment to the owner of the variable annuity contract at a second payment time, wherein the second distributed payment is limited to the second guaranteed annual withdrawal amount; and adjust one or more contract values associated with the variable annuity contract based on at least the second distributed payment.

11. A system, comprising:

an interface configured to receive:
- investment return information associated with a variable annuity contract, wherein a guaranteed lifetime withdrawal benefit rider is associated with the variable annuity contract;
- variable fee information associated with the variable annuity contract; and
- withdrawal information associated with the variable annuity contract;

a memory device configured to store:
- a plurality of annual lifetime payment (ALP) percentages;
- a threshold benefit determining percentage (BDP);
- contract value (CV) logic;
- withdrawal adjustment base (WAB) logic;
- benefit determining percentage (BDP) logic; and
- annual lifetime payment (ALP) percentage logic; and a processor coupled to the memory device, the processor configured to:
- execute the CV logic to determine a first CV associated with the variable annuity contract at a first time;
- execute the WAB logic to determine a first WAB associated with the first CV;
- execute the BDP logic to calculate a first BDP based on the first CV and the first WAB;
- execute the ALP percentage logic to:
  - compare the first calculated BDP to a threshold BDP;
  - automatically select a first ALP percentage of the plurality of ALP percentages when the first calculated BDP satisfies the threshold BDP; and
  - automatically select a second ALP percentage of the plurality of ALP percentages when the first calculated BDP does not satisfy the threshold BDP.

12. The system of claim 11, wherein the processor is further configured to:
- execute the CV logic to determine a second CV associated with the variable annuity contract at a second time;
- execute the WAB logic to determine a second WAB associated with the second CV;
- execute the BDP logic to calculate a second BDP based on the second CV and the second WAB; and
- execute the ALP percentage logic to:
  - compare the second calculated BDP to the threshold BDP;
  - automatically select the first ALP percentage of the plurality of ALP percentages when the second calculated BDP satisfies the threshold BDP; and
  - automatically select the second ALP percentage of the plurality of ALP percentages when the second calculated BDP does not satisfy the threshold BDP.

13. The system of claim 12, wherein the first ALP percentage is selected based on the first calculated BDP and the second ALP percentage is selected based on the second calculated BDP, and wherein the first ALP percentage is greater than the second ALP percentage.

14. The system of claim 12, wherein the second ALP percentage is selected based on the first calculated BDP and the first ALP percentage is selected based on the second calculated BDP, and wherein the first ALP percentage is greater than the second ALP percentage.

* * * * *